(12) United States Patent
Vincenti

(10) Patent No.: US 6,874,844 B2
(45) Date of Patent: Apr. 5, 2005

(54) NOTCHBACK MOTOR VEHICLE

(75) Inventor: Richard Vincenti, Evette-Salbert (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/480,594

(22) PCT Filed: Jun. 14, 2002

(86) PCT No.: PCT/FR02/02050

§ 371 (c)(1),
(2), (4) Date: Dec. 12, 2003

(87) PCT Pub. No.: WO02/102641

PCT Pub. Date: Dec. 27, 2002

(65) Prior Publication Data

US 2004/0174048 A1 Sep. 9, 2004

(30) Foreign Application Priority Data

Jun. 15, 2001 (FR) .......................................... 01 07886

(51) Int. Cl.⁷ .............................................. B25D 25/08
(52) U.S. Cl. .............................. 296/203.04; 296/193.08
(58) Field of Search ........................... 296/193.08, 198, 296/203.04

(56) References Cited

U.S. PATENT DOCUMENTS

| | | | | |
|---|---|---|---|---|
| 3,661,419 A | * | 5/1972 | Mitamura et al. ..... | 296/203.04 |
| 4,234,225 A | * | 11/1980 | Harasaki et al. ....... | 296/203.04 |
| 4,408,794 A | * | 10/1983 | Harasaki ................ | 296/203.04 |
| 5,123,696 A | * | 6/1992 | Watari .................... | 296/203.04 |
| 5,246,263 A | | 9/1993 | Tanaka et al. | |
| 6,113,180 A | * | 9/2000 | Corporon et al. ...... | 296/203.04 |
| 6,126,232 A | * | 10/2000 | Nakano ................. | 296/203.04 |
| 6,196,622 B1 | * | 3/2001 | Brodt et al. ........... | 296/203.04 |
| 6,273,498 B1 | * | 8/2001 | Hillman et al. ........ | 296/203.01 |
| 6,443,518 B1 | * | 9/2002 | Rohl et al. ............. | 296/203.04 |
| 2004/0080188 A1 | * | 4/2004 | Igarashi et al. ........ | 296/203.04 |

FOREIGN PATENT DOCUMENTS

| | | |
|---|---|---|
| DE | 196 25 026 | 1/1997 |
| JP | 61-67675 | 4/1986 |
| JP | 62-88674 | 4/1987 |
| JP | 08-230714 | 9/1996 |

* cited by examiner

*Primary Examiner*—Lori L. Coletta
(74) *Attorney, Agent, or Firm*—Westerman, Hattori, Daniels & Adrian LLP

(57) ABSTRACT

The body of a notchback motor vehicle, having at the rear, a rear load floor to which are fixed two lateral members each having a wheel housing and a lateral quarter pillar forming one part of one side of the passenger compartment. The two lateral quarter pillars are held together at the top by a cross member known as the rear window cross member, which supports the roof. Stiffening at least one lateral member in such a way as to transfer the forces exerted on the bottom of the body when the vehicle is moving directly to the upper cross member having a panel stiffener which is joined to the lateral quarter pillar and which exerts from the rear window lower cross member to the rear window upper cross member.

9 Claims, 2 Drawing Sheets

NOTCHBACK MOTOR VEHICLE

The present invention concerns a motor vehicle known as "notch-back".

It must be understood here and in the framework of the invention that a vehicle known as "notch-back" is a vehicle with four individual doors for the passengers and in which the body has a first angle line between the engine hood and the front windshield and a second angle line between the rear window and the trunk of the vehicle, the rear window being attached to the body.

In this type of vehicle, the fixed rear shelf limits the loading possibilities because the communication between the trunk and the passenger compartment is limited when the rear seat is folded. This limitation can occasionally be detrimental when it is desired to load bulky objects through the trunk.

A goal of the invention is then to remedy these above-mentioned drawbacks, and thus to propose a "notch-back" vehicle body that makes it possible to load bulky objects through the trunk.

To this effect, an object of the invention is a body of a "notch-back" motor vehicle, comprising, in its rear portion, a rear loading floor on which are fixed two lateral pillars each comprising a wheel housing and a rear-end lateral pillar constituting a portion of a side of the passenger compartment, the two rear-end lateral pillars being maintained to each other at their upper portion by a cross member called "rear window upper cross member" and adapted to support the roof, characterized in that it further comprises means for stiffening at least one lateral pillar so as to transfer forces to which the lower portion of said body is subjected when the vehicle is moving directly to the upper cross member.

Advantageously, the stiffening means comprise a panel stiffener having a shape conjugated to the rear-end lateral pillar.

Advantageously, also, the stiffening means comprise two rear-end lower wall portions having thicknesses dimensioned to support the forces and welded to the stiffener.

Advantageously, finally, the stiffening means comprise an upward strengthening piece having a thickness dimensioned to support the forces.

The invention also concerns a notch-back motor vehicle comprising a rear shelf adapted to cover the space between the trunk and at least a portion of the foldable rear seat, characterized in that the shelf is removable.

Other advantages and characteristics of the invention will be better understood by reading the detailed description made in reference to the following figures in which:

FIG. 1 shows a body 1 of a notch-back motor vehicle such as it presently comes out of a welding workshop in a manufacturing unit, immediately before it enters in the assembly workshop, and after the painting operation.

Figure 1:
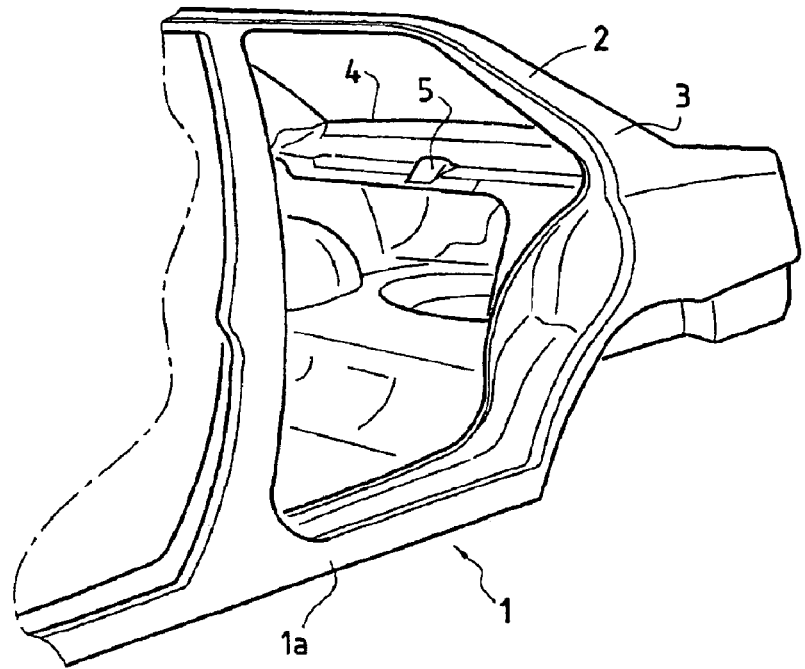
FIG. 1 is a partial perspective rear view of a vehicle body according to the state of the art.

This body 1 has, in its rear portion, two lateral pillars 2 in the form of two rear-end lateral pillars 3. These pillars 3 are connected to each other, on the one end, at its upper portion through a cross member called rear window upper cross member, positioned under the roof, and on the other end, at its lower portion through a shelf 4 made of stamped metal and a cross member called rear window lower cross member 5.

The lateral ends of the upper cross member, which is not shown, and of the shelf 4, are welded to the interior of the rear-end pillars 3, and thus, stiffen the body. The forces to which the lower portion 1a of the body is subjected when the vehicle is moving pass directly through the shelf 4 in this configuration.

The presence of this shelf 4 is particularly detrimental for accessibility of the passenger compartment through the trunk, even when the rear seat is completely folded.

In addition, the loading capacity of the notch-back vehicle is reduced and it is not possible to load bulky objects.

Figure 2:
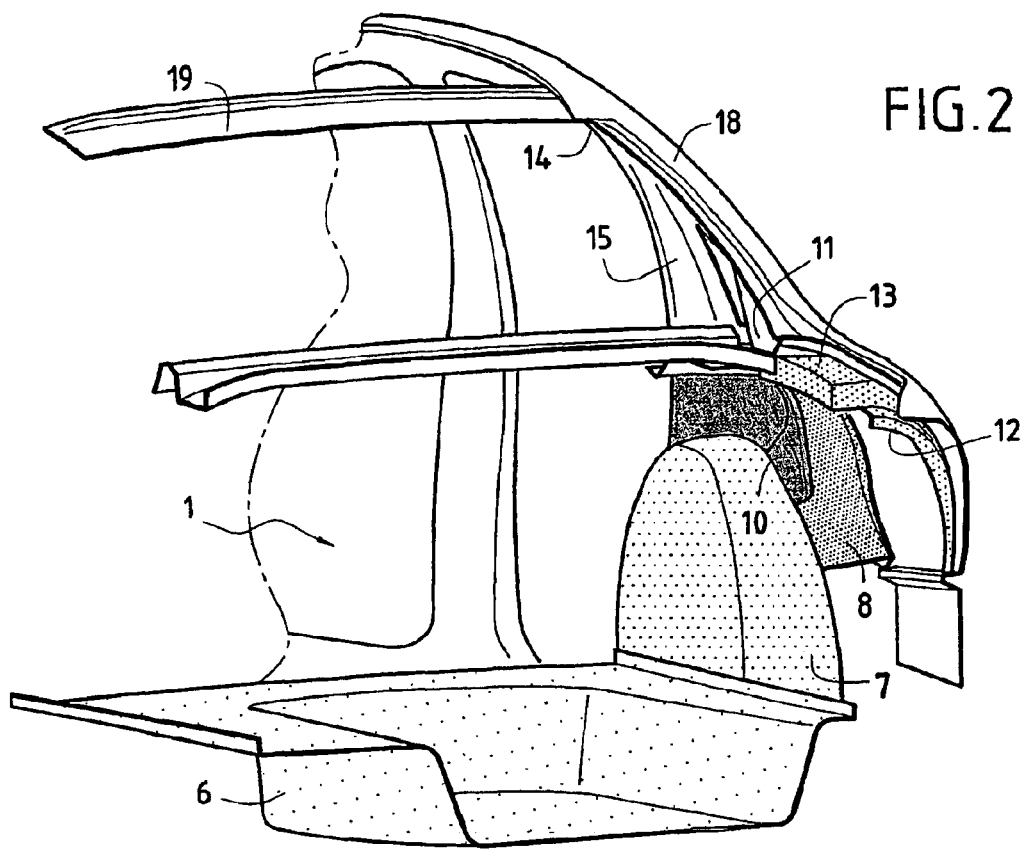
FIG. 2 is a partial perspective interior view of the rear portion of a vehicle body according to the invention.
Figure 3:
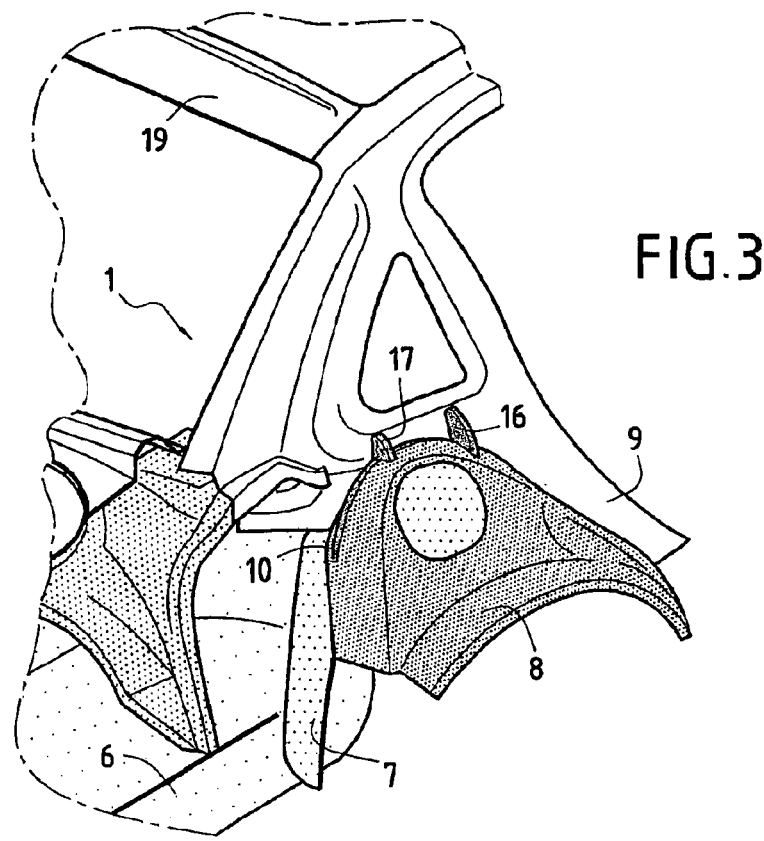
FIG. 3 is a partial perspective side view of the rear portion of a vehicle body according to the invention.

To solve this problem, a body is proposed, the right lateral side of whose rear portion is shown on FIGS. 2 and 3, the left lateral side being strictly identical.

This body 1 comprises, in a manner known in itself, a loading floor 6 to which is welded a first sub-assembly constituted by a wheel housing 7, which is itself welded to a rear fender liner 8, these parts being welded at their upper portion to the fender liner closure 9 and to the rear-end lower liner 10.

On this sub-assembly is welded a second sub-assembly constituted by a strengthened upward strengthening piece 11 (whose thickness has been considerably increased as compared to those used according to the state of the art), and by a rear gutter liner 12. The assembly of these two sub-assemblies is made through a rear lateral shelf 13 and a rear-end upper liner 14. This second sub-assembly also comprises a side panel stiffener 15 having a large thickness and whose dimensions are such that it follows substantially the shape of the final rear-end pillar 2.

So as to ensure a perfect cohesion between these sub-assemblies, front and rear rear-end lower walls 16, 17 are provided and are welded to the side panel stiffener 15 and to the fender liner 9 so as to result in a ribbed structure between the two above-mentioned sub-assemblies. To perfect the assembly and ensure stiffness of the thus constituted assembly, the side of the passenger compartment 18 is connected thereto by welding. The assembly with the rear window upper cross member 19 is then effected in a manner known in itself by welding, as well as that of the rear window lower cross member, which serves only to receive the rear window.

With such a configuration, the forces to which the lower portion of the body is subjected when the vehicle is moving are directly transferred to the upper cross member.

This body 1 makes it possible to use a removable rear shelf that does not participate to the stiffening of the body like those according to the state of the art. This shelf can, in a manner known in itself, be a thermoformed shelf in plastic material or any other equivalent system.

When it is desired to load bulky objects in the notch-back vehicle comprising the body according to the invention, it is then easy to remove the rear shelf in the same manner as a rear shelf of a vehicle equipped with a hatch door and to fold the rear seat.

Of course, it is self-evident that many modifications of the device can be envisioned without leaving the scope of the invention.

What is claimed is:

1. Body of a notch-back motor vehicle, comprising, in its rear portion, a rear loading floor on which are fixed two lateral pillars each comprising a wheel housing and a rear-end lateral pillar constituting a portion of a side of the passenger compartment, the two rear-end lateral pillars being maintained to each other in their upper portions by a cross member called "rear window upper cross member" and adapted to support the roof, means for stiffening at least one lateral member so as to transmit forces to which the lower portion of said body is subjected when the vehicle is moving directly to the upper cross member, wherein the stiffening means comprise a panel stiffener having a shape adjusted to a shape of the rear-end lateral pillar and extending from the rear window lower cross member to the rear window upper cross member.

2. Body according to claim 1, wherein the stiffening means comprise two rear-end lower wall portions having thicknesses dimensioned so as to support the forces and welded to the stiffener.

3. Body according to claim 1, wherein the stiffening means comprise an upward strengthening piece dimensioned to support the forces.

4. Notch-back motor vehicle comprising a body according to claim 1 and a rear shelf adapted to cover the space between the trunk and at least a portion of the foldable rear seat wherein the shelf is removable.

5. Body according to claim 2, wherein the stiffening means comprise an upward strengthening piece dimensioned to support the forces.

6. Notch-back motor vehicle comprising a body according to claim 2 and a rear shelf adapted to cover the space between the trunk and at least a portion of the foldable rear seat wherein the shelf is removable.

7. Notch-back motor vehicle comprising a body according to claim 3 and a rear shelf adapted to cover the space between the trunk and at least a portion of the foldable rear seat wherein the shelf is removable.

8. Notch-bark motor vehicle comprising a body according to claim 5 and a rear shelf adapted to cover the space between the trunk and at least a portion of the foldable rear seat wherein the shelf is removable.

9. Notch-back motor vehicle according to claim 1, wherein the two rear-end lateral pillars are maintained parallel to each other in their upper portions by the rear window upper cross member.

* * * * *